March 2, 1937.   D. A. MEEKER ET AL   2,072,681
FOOD HANDLING APPARATUS
Filed Dec. 15, 1931   4 Sheets-Sheet 1

INVENTOR
David A. Meeker
BY John C. Slager
Maréchal & Noé
ATTORNEY

March 2, 1937.  D. A. MEEKER ET AL  2,072,681
FOOD HANDLING APPARATUS
Filed Dec. 15, 1931  4 Sheets-Sheet 3

INVENTOR
David A Meeker
BY John C Slager
Maréchal & Noe
ATTORNEY

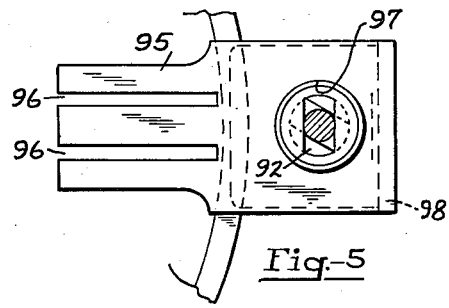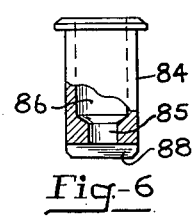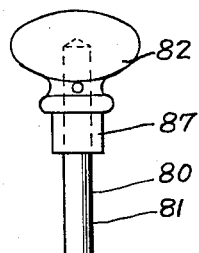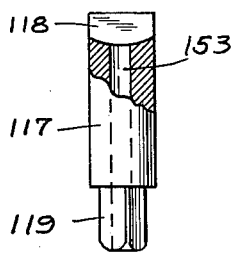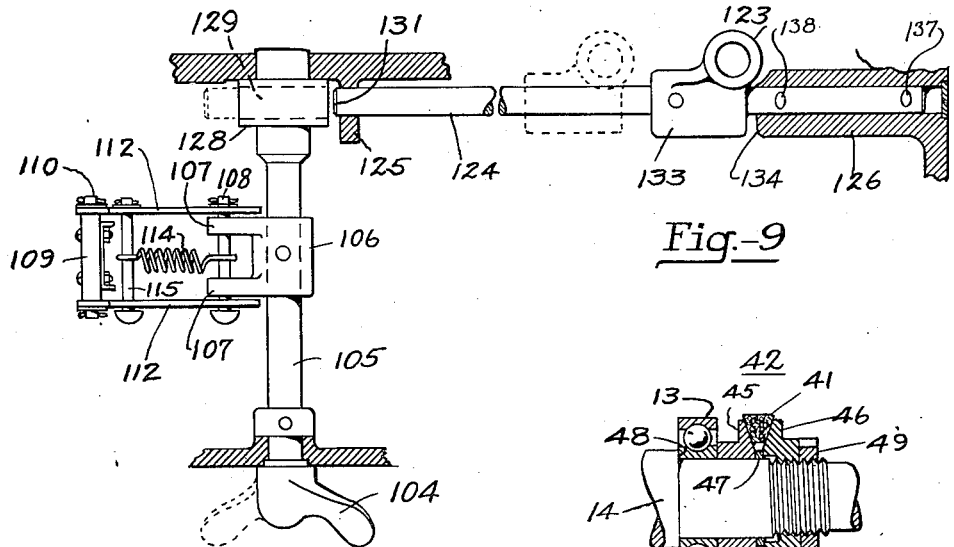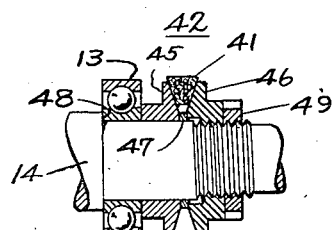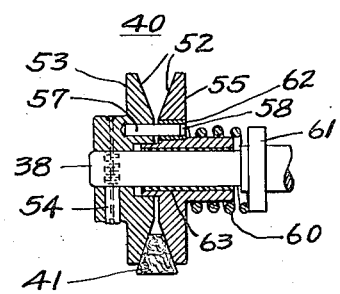

Patented Mar. 2, 1937

2,072,681

UNITED STATES PATENT OFFICE 2,072,681

FOOD HANDLING APPARATUS

David A. Meeker and John C. Slager, Troy, Ohio, assignors to The Hobart Manufacturing Company, Troy, Ohio, a corporation of Ohio Application December 15, 1931, Serial No. 581,188

9 Claims. (Cl. 146—67)

This invention relates to food handling apparatus and more particularly to a motor driven food cutter.

One of the principal objects of the invention is to provide a motor driven food cutter which is of simple, compact, and economical construction, is easy and safe to operate and is effective in operation, and is readily maintained in a sanitary condition.

Another object of the invention is to provide a food cutter of this character, in which an effective proportioning of bowl, knife and knife shaft is provided, together with a close spacing of the knife shaft above the rim of the bowl, and which at the same time provides for the easy and rapid removal of the bowl without disturbing or moving the knife shaft.

Another object of the invention is the provision of a machine of this character provided with an interlocking mechanism in which the knives are prevented from being driven by the motor except when the cover is closed, and the cover is prevented from being raised to expose the knives except when the motor is stopped, and in which the parts of the interlocking mechanism are effectively enclosed to positively prevent tampering therewith and to maintain them in a sanitary condition.

A further object of the invention is the provision of such a machine having a knife shaft projecting over the bowl for operation upon food stuff therein, in which the bearing support of the knife shaft is removed from above the bowl to prevent contamination of food stuffs with bearing lubricant.

Another object of the invention is the provision in a machine of this character of a simple drive for the bowl which is effective and quiet in operation, and is automatically maintained in proper operating adjustment.

Other objects and advantages of the invention will be apparent from the following description, the accompanying drawings and the appended claims.

In the drawings, which disclose a preferred embodiment of the invention,—

Fig. 5 is a plan view of the knife cleaner and is taken as indicated by the line 5—5 of Fig. 3;

Fig. 6 is a view partly in section of the latch sleeve;

Fig. 7 is a view partly in section of the latch actuated member;

Fig. 8 is an elevational view of the cover latch;

Fig. 9 is a fragmentary view of the interlock mechanism;

Fig. 10 is a sectional view of the driven pulley taken on the line of the shaft axis, and Fig. 11 is a sectional view of the driving pulley taken on the line of shaft axis.

Figure 1:
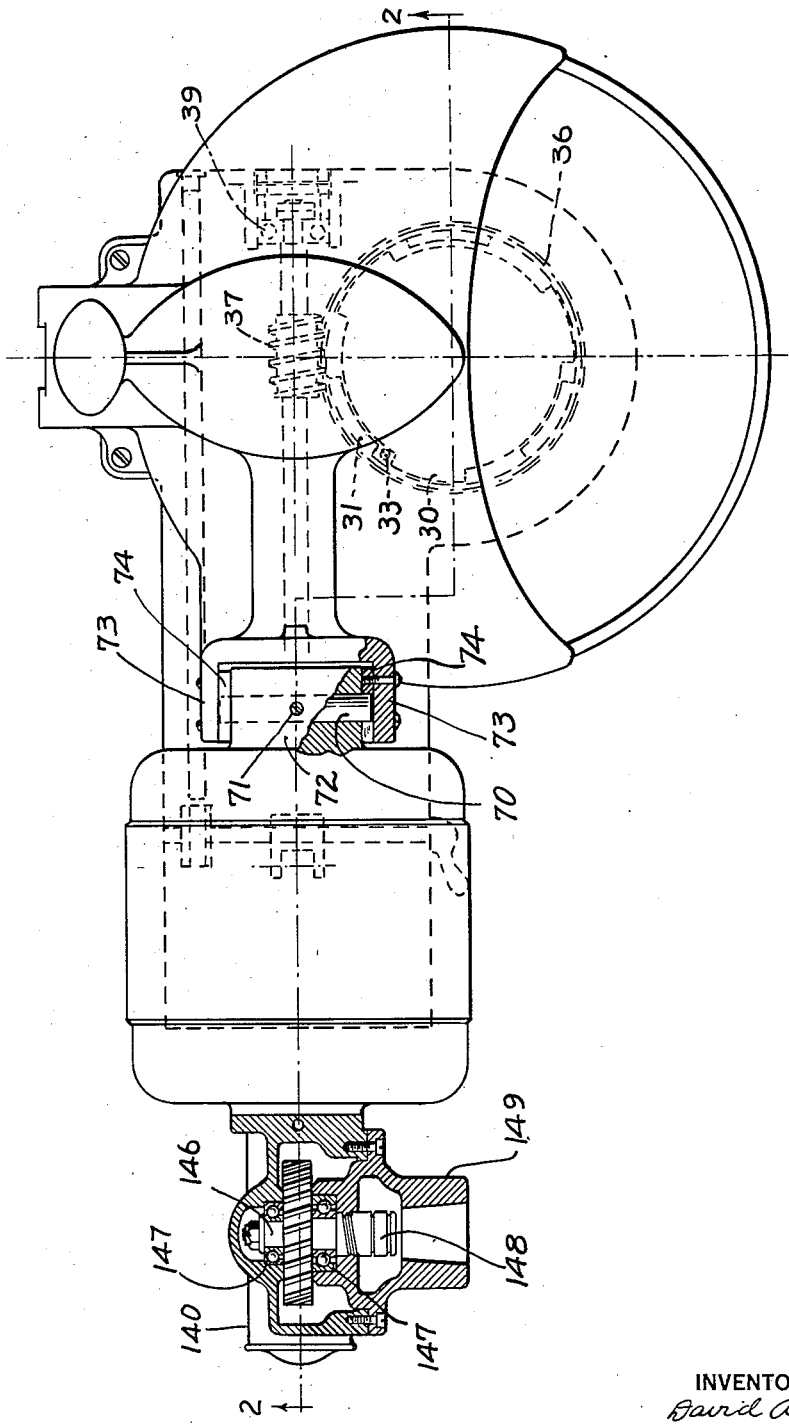
Fig. 1 is a plan view of a motor driven food cutter constructed in accordance with this invention, certain of the parts being broken away or in section for clearness of illustration.

In the drawings, in which like characters of reference designate like parts throughout the several views thereof, the numeral 10 designates the machine base upon which a motor is mounted; the motor housing being designated by the numeral 11. The motor housing is provided with bearings 12 and 13 for the support of a horizontally extending shaft 14. This shaft serves not only to carry the motor armature 15, but in addition has an integrally extending portion 16 upon the end of which the cutting knives 17 are attached. The knives 17 are mounted as a unit so that they may be readily detached when desired. As shown, the knives 17 are carried on a sleeve 18 and are held thereon by a nut 19; a suitable spacing collar 20 being provided to position the knives a proper distance apart. This assembled knife unit is received upon the end of the shaft extension 16 and is held thereon by provision of a nut 22; driving forces being transmitted by interengagement of the shaft 16 and collar 18 as indicated at 23.

Food to be treated in the machine is placed within a bowl 25 that is so positioned upon the machine base 10 that the knives 17 traverse a path through the bowl. The bowl has an upstanding central portion which with the rim portion forms a ring-like trough of segmental cross section; the cross-sectional shape conforming to the sweep of the knives 17. In order that all of the food contained within the bowl may be treated by the knives, the bowl is supported upon a rotatable member 26 that is driven from the motor 11. The knives rotate on a horizontal axis and the bowl rotates on a vertical axis to thus continually present different portions of the contained food to action of the knives. The bowl preferably travels at a relatively slow rate as compared to the speed of rotation of the knives; a suitable proportioning of knife and bowl rotation being in the ratio of 1700 R. P. M. for the knives and 25 R. P. M. for the bowl.

The bottom of the bowl has formed thereon a depending ring 27 which rests upon the disk-like surface 28 of the supporting member 26. The bowl ring 27 is enclosed by an upstanding annular flange 29 of the supporting member 26. The ring 27 is extended at equally spaced points, shown to be three in number, to form lugs 30, and the flange 29 is extended also at three equally spaced points to form lugs 31, the lugs 31 overlying the lugs 30 in operating position of the bowl. The circumferential extent of the lugs and their intermediate spacing is such that the intermediate space between two adjacent lugs is materially greater than the circumferential length of each lug. When placing the bowl on its supporting member, the bowl is first turned so that the lugs 30 are received within the intermediate spaces or clearance areas 32 and, after entrance therein, the bowl is turned so that the lugs 30 are brought beneath the lugs 31 so as to prevent upward removal of the bowl. Mounted in the plate 28 immediately adjacent one of the lugs 31 is an upstanding stop member 33, which may be a set screw threaded in a drilled hole in the plate 28 in position to engage one of the lugs 30 when the bowl is rotated in one direction so as to stop the rotation of the bowl in proper operating position with the lugs 31 superimposed on the lugs 30. This stop 33 also forms a driving engagement between the bowl ring 27 and the plate 28, so that the bowl is positively driven and rotated when the member 26 is rotated by the motor drive. When the bowl is rotated relatively to the plate 28 in the opposite direction, another lug 30 eventually engages the stop 33 when the lugs 30 are intermediate the lugs 31, so that the bowl can be readily removed from its mounting.

The bowl supporting member 26 has an extending shaft 34 which is carried in a bearing 35 formed as a boss on the base 10. A worm gear 36 is attached to the shaft 34 and meshes with a worm 37 that is fixed to shaft 38. The shaft 38 is supported in the base 10 upon bearings 39, and at its inner end carries a driven pulley 40. The pulley 40 is driven from the motor shaft 14 by a belt 41 which runs over a pulley 42 carried on the shaft 14.

The pulleys 40 and 42 are shaped to receive a V-belt and are constructed so that the belt may be readily applied and, when in use, will be automatically maintained in proper operating adjustment even though the pulley shafts are maintained in fixed spaced relationship. As shown, the pulley 42 comprises two parts, the adjacent faces of which are conically formed, as indicated at 44, to provide a driving V for reception of the belt. One of the pulley parts, indicated by the numeral 45, has a loose fit on the shaft 14, while the other part, indicated by the numeral 46, is threadedly received upon the shaft. A spacing washer 47 of desired width is positioned between the members 45 and 46. The arrangement of the motor parts is such that by tightening the pulley part 46 upon the threaded shaft clamping engagement is provided for the pulley parts and for the motor shaft bearing 13 as well. As shown, the shaft 14 is shouldered at 48 and the inner race of the bearing 13 is positioned in contact with this shoulder. The pulley part 45 stands between the bearing 13 and the washer 47. After tightening the pulley part 46 against the washer 47 to hold the assembly rigidly in place, a lock nut 49 is drawn up against the pulley part 46 so that the clamped assembly may be maintained in service without danger of loosening. The two part pulley 42 permits easy access to the belt 41 should replacement be necessary as the lock nut 49 and pulley part 46, upon being removed from the shaft 16, provide sufficient space for passage of the belt whereby it may be removed through the end of the motor housing.

The pulley 40, like the pulley 42, also comprises two separate parts which have adjacently related faces 52 of conical form providing a driving V for the belt. As shown, the pulley part 53 is fixed by means of a pin 54 to the end of the shaft 38 while the pulley part 55 is slidably received on that shaft. The fixed pulley part 53 carries a pin 57 which projects into an opening 58 in the part 55 and thus prevents rotational movement of the loose part 55 relatively to the shaft while permitting it to travel axially of the shaft 38. The pulley part 55 is urged toward the part 53 by provision of a spring 60, one end of which bears against the part 55 while the other end bears upon a collar 61 carried by the shaft 38 adjacent the bearing 39. A sleeve 62 is provided where the pin 57 enters the pulley part 55, and a sleeve 63 serves as a bearing for the part 55 on the shaft 38. These sleeves are made of some suitable resilient material, very satisfactory results being secured with a rubber sleeve 62 and a bakelite sleeve 63. By provision of the two part pulley 40, in which the pulley parts are constantly urged toward one another by the spring 60, proper operating adjustment for the belt 41 is maintained over a long period of use because stretching in the belt as a result of continued use permits the spring to act and thus force the pulley parts toward one another to in effect increase the pulley diameter and thus maintain the belt taut. Further adjustment of the belt may be obtained by variation of the thickness of the spacing washer 47 of the pulley 42.

The bowl drive, comprising the pulleys 40 and 42 and the belt 41, and the shaft 38 and gears 36 and 37, is enclosed within the motor housing and base so that the complete bowl drive is effectively guarded to thus prevent possible injury to the machine operator. This complete enclosure of the drive parts also serves to effectively prevent tampering with this portion of the machine.

The shaft 14 and its extension 16 receive their sole support from the motor bearings 12 and 13. These bearings are within the confines of the motor housing and are thus positioned outide of that area defined by a vertical projection of the rim of the food receiving bowl 25. Such a construction eliminates any possibility of contamination of the food within the bowl by a drip of lubricant from any part of the shaft supporting structure as this structure is entirely removed from the bowl. Adequate support for the knives 17 is provided by the sturdy shaft extension 16 which is shown tapered and is of sufficient size to withstand the loads imposed upon it by the knives even though supported at points remote from the knives.

The machine is constructed so as to provide for ready removal of the bowl 25. As mentioned above, the bowl is readily removable from its supporting member 26 by a single turning of the bowl an amount sufficient to release the lugs 30, or until engaged by the stop 33, whereupon it may be tilted so as to clear the knives and may be thus withdrawn from beneath the shaft 16 without disturbing the motor and the motor shaft.

Figure 3:
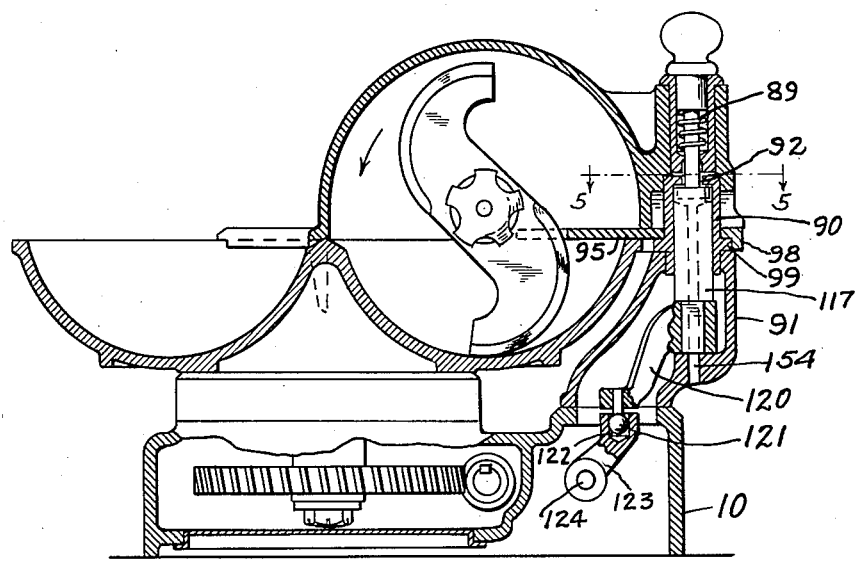
Fig. 3 is a sectional view taken on the line 3—3 of Fig. 2.

The proportioning of the parts, including the diameter of the circumscribing circle of the lugs 30, together with the extent of offset of the shaft 16 from the center of the bowl, and the clearance of the shaft 16 from the rim of the bowl, contributes to provide this described removability of the bowl by tilting and sliding out from beneath the knife shaft 16 without movement of this knife shaft. A number of factors are taken into consideration. First, the knife shaft should have its axis substantially in the center of the segmental trough of the bowl at the location of the knives (see Fig. 3), so that the cutting edges of these knives operate immediately adjacent the surface of this trough of the bowl. Secondly, it is found that the power required of the motor to drive the knives is a function of the diameter of the knives, increasing materially as the diameter of the knives is increased. For reasons of economy, it is therefore desirable that the diameter of the knives be as small as is compatible with the size and cutting requirements of the machine. This is accomplished by positioning the knife shaft close to the rim of the bowl, so that there is only a small clearance between the lower edge of the shaft and the rim of the bowl. This in turn permits only a small lifting action of the entire bowl before it contacts with the knife shaft, such as to render impossible the direct lifting of the bowl to remove all the lugs 30 above the plane of the upper surface of the supporting member 26 and the lugs 31. This is overcome in accordance with the present invention by the provision of the lug ring of a predetermined diameter, such that direct upward lift of the bowl is unnecessary but rather the bowl can be tilted upwardly at one side, generally that opposite the shaft 16, so that the rear portion of the ring 27 and the rearward lugs 30 rock on the upper surface of the plate 28 similar to the action of a ball and socket joint. This enables the forward edge of the bowl to be tilted sufficiently to lift the forward edge of the ring 27 and lugs 30 above the upper edge of the supporting member 26, whereupon the entire bowl can then be drawn or slid forwardly, the rear edge of the ring 27 sliding over the surface of plate 28, until finally the entire bowl can be readily moved sidewise from its mounting and from beneath the knife shaft 16. It is found that a certain definite diameter range of the lug ring 27 and the cooperating member 26, depending upon the diameter of the bowl and the clearance of shaft 16 above the rim of the bowl, gives this tilting removal. If the diameter of the lug ring is too small, insufficient rocking movement of the ring 27 on plate 28 is allowed to lift the forward edge of the ring 27 and lugs over the top of the adjacent edge of member 26. If the diameter of the lug ring is too large, such as to extend materially beyond the vertical center line of shaft 16 as shown in Fig. 3, then the tilting about the rear edge of the ring effects such upward movement of the rim of the bowl directly beneath the knife shaft as will cause contact of the rim of the bowl with the knife shaft, before the forward edge of the ring clears the cooperating edge of the supporting member. By way of example, with a bowl diameter of 14½ inches, and a clearance of the shaft 16 from the rim of the bowl of about ⅛ of an inch, very satisfactory results have been secured with a lug ring of the order of 6½ inches in diameter. In the construction shown, the shaft 16 extends only part way across the bowl and this further facilitates the easy tilting removal of the bowl; but this construction is also adaptable to machines of this character in which the shaft extends completely across one side of the bowl and provides the easy tilting removal of the bowl without disturbing or moving the knife shaft. If the knives are turned so that they stand horizontally the bowl may be removed by this tilting movement without removing the knives. This avoids the necessity of removing the food stuffs from the bowl prior to withdrawal of the bowl from the machine, and contributes materially to the convenience and sanitation of the machine.

Figure 4:
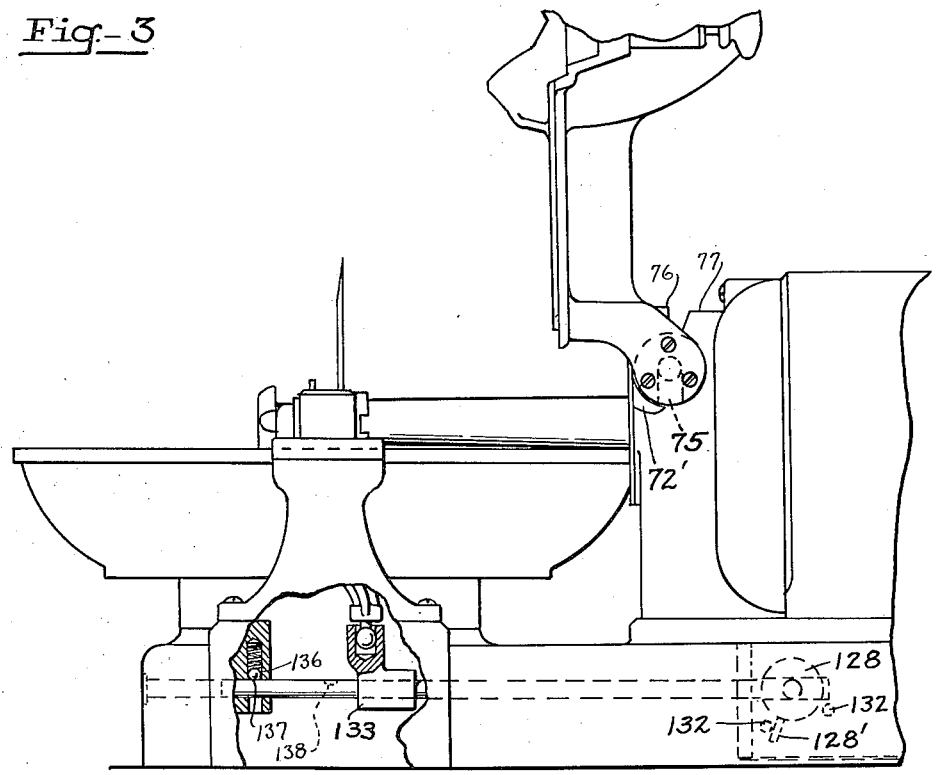
Fig. 4 is a fragmentary side elevational view of the machine with the cover in open position.

A cover 65 is provided for the knives 17 so that during use of the machine the knives may be effectively enclosed to prevent injury to the operator. The cover serves also as a closure to prevent scattering of food under treatment. As shown, the cover 65 comprises a flat plate portion 66 which overlies that portion of the bowl adjacent the knives, and a dome shaped portion 67 within which the knives rotate. The cover 65 is hinged to the motor housing and is movable on this hinge axis from a position of closure over the bowl to a removed position in which the cover stands away from the bowl. As shown, the hinge comprises a pin 70 which is held by a set screw 71 in a projection 72 on the motor housing. The cover 65 has a yoke extension comprising spaced arms 73 which overlie the ends of the pin 70. Adjacent sides of the arms 73 have affixed to them collars 74 which are slotted at 75 to receive the pin 70. Bosses 72' on the projection 72 lie closely adjacent the periphery of each collar 74 and serve to retain the cover 65 in place upon the hinge pin 70 in all positions except that in which the cover has been swung upwardly to a vertical position as indicated in Fig. 4. In the position of Fig. 4 the cover may be withdrawn from the machine by lifting it upwardly so that the pin 70 passes through the slots 75 of the collars 74 without interference from the bosses 72'. When the cover is swung somewhat beyond the vertical, a stop 76 on the cover contacts with a stop 77 on the motor housing to limit this movement, the force of gravity then acting to hold the cover in its raised position.

The cover hinge axis is horizontal and is perpendicularly related to the axis of the shaft 14 so that when swinging the cover to open position the cover moves to a position over the motor and is thus retained within the general lateral confines of the machine. These machines are frequently installed in cramped quarters and it is therefore of decided advantage to provide for cover removal in a manner that permits the machine to be effectively operated within a small amount of space.

The cover is provided with a latch 80 so that it may be retained in closed position. As shown, the latch comprises a stem 81 having upon one end a handle 82 for actuation by the operator, and on the other end a cross-bar 83. The latch 80 is carried on the cover within a stationary sleeve 84 having a portion 85 which rotatably carries the stem 81 of the latch. The body of the sleeve 84 is bored out to a diameter, as indicated at 86, to slidably receive the cylindrical part 87 of the latch, and the lower end of the sleeve 84 is notched at 88 to receive the cross bar 83 of the latch. The latch is urged upwardly with respect to the sleeve by a spring 89 which serves to retain the bar 83 in the notch 88.

Latching engagement in the closed position of the cover is provided by a member attached to the base 10 within which the latch cross bar 83 is received and with which it may engage. As shown, the latch receiving member is in the form of a sleeve 90 which is carried upon a hollow member 91 fixed to the base 10. The upper end of the latch receiving member 90 is closed except for a slot 92 shaped similarly to and of such size that the latch cross bar 83 may pass through. The cross bar receiving notch 88 of the sleeve 84 and the slot 92 are coordinated as to position so that when the cross-bar 83 is retained in the notch 88 it will be aligned for passage through the slot 92; this being the unlatched position of the cross bar. To latch the cover in closed position the operator first closes the cover and then pushes down on the handle 82 against the spring 89 to move the cross-bar 83 through the slot 92 whereupon it may be turned crosswise to the slot 92, so that the cover is then held in place. Upon moving the latch to unlatched position the spring causes it to be withdrawn through the slot and to enter the notch 88 where it is held in proper position for reentrance through the slot 92.

The knives 17 are maintained free of food by provision of a knife cleaner or comb which comprises a plate 95 having spaced slots 96 for passage of the knives. As shown, the comb plate has a circular opening 97 and has also a downturned flange 98. The opening 97 is of such size that it is closely received upon the exterior of the latch receiving member 90 which carries a ledge 99 so related that it closely engages the comb flange 98 when in assembled position thereon. In closed position the cover bears on the comb and thus serves to maintain it in proper operating position. Upon removing the cover the comb 95 is retained in position by its inter-engagement with the member 90 and ledge 99 and may be readily removed by merely lifting it from such engagement.

Control of the motor is afforded through a switch 100 which is shown mounted within the machine base. The switch is of the knife type and comprises one or more fixed contacts 101 which are adapted to receive a corresponding number of movable blade contacts 102. The construction of the fixed contacts 101 is such that they offer frictional resistance to removal of the blade contacts. A switch operating handle 104 is positioned on the exterior of the machine within convenient reach of the operator. This handle is fixed to a rotatable shaft 105 that extends through the machine. An arm 106, fixed to the shaft 105, has spaced projecting lugs 107 through which a pin 108 passes. The blades 102 of the switch are inter-connected by block 109 for simultaneous movement. The block has attached to it a cross pin 110. The pins 108 and 110 are operably connected by parallel links 112 so that actuation of the handle 104 will result in operation of the switch. As shown, the links are pivotally connected to the pin 110 and have a slotted connection with the pin 108 as indicated at 113. A spring 114 is connected into the switch linkage; one end engaging the pin 108 while the opposite end engages a pin 115 extending between the links 112.

Figure 2:
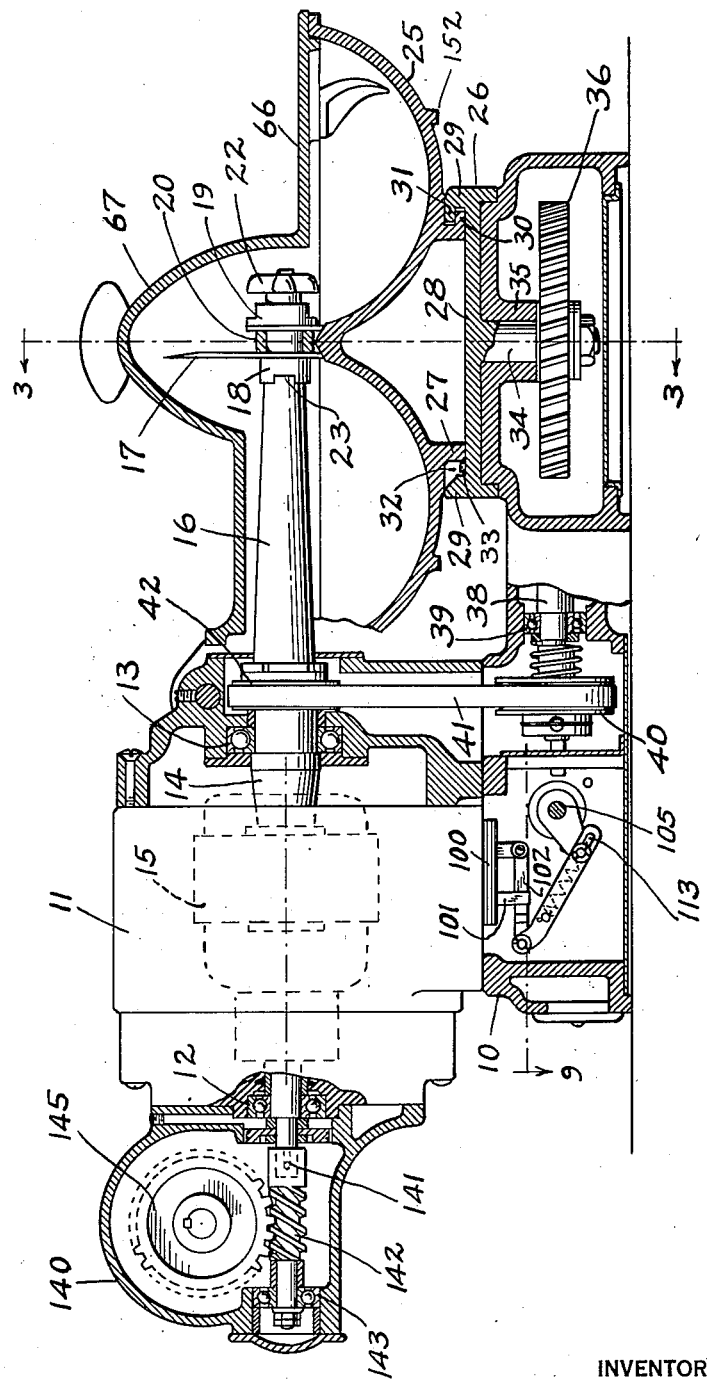
Fig. 2 is a sectional view taken on the line 2—2 of Fig. 1.

The slotted connection 113 between the links 112 and the pin 108 permits lost motion in the switch actuating linkage that results in rapid withdrawal of the blades 102 from engagement with the fixed contacts 101 and eliminates the possibility of arcing and consequent damage to the switch upon opening the motor circuit. In Fig. 2 the switch is shown in closed position. Upon moving the handle 104 so as to rotate the shaft 105 in a counter-clock-wise direction the spring 114 is extended without movement of the blades 102 until lost motion provided by the slots 113 is taken up whereupon further movement of the shaft 105 causes the links 112 to move and the switch blades to be withdrawn from engagement with the fixed contacts. As soon as the switch blades have been withdrawn a sufficient amount for the tension of the spring 114 to exceed the frictional resistance of the fixed contacts 101 the switch moves quickly under action of the tensioned spring to an open position. Closure of the switch is accomplished by turning the handle 104 in a clockwise direction.

To provide for the safety of the machine operator so that the motor may not be started when the cover is in removed position, or the cover may not be removed while the motor is turned on, an inter-lock is provided which is effective between the motor switch and the cover. As shown, the cross-bar 83 of the latch, upon passing through the slot 92, is received within the notch 118 of a rotatable member 117. The interengagement between the cross bar 83 and member 117 results in rotation of this member corresponding to movement of the cross bar between latched and unlatched positions. The actuated member 117 carries the latch engaging member 118 at one end, and at the opposite end has a squared projection 119 upon which an arm 120 is attached. This arm carries a ball 121 which is received within the socket 122 of an arm 123 fixed to a movable rod 124 that is supported at 125 and 126 within the base 10. Rotational movement of the latch between latched and unlatched positions produces axial movement in the rod 124.

The rotatable shaft 105, to which the handle 104 is affixed, carries a cylindrical member 128 having a passage 129 perpendicularly related to the axis of rotation of the shaft 105. This passage 129 is so positioned that when the handle 104 is in the open circuit position of the switch the passage 129 becomes aligned with the rod 124 for its entrance therein. In unlatched position of the cover the end 131 of the rod 124 projects within the passage of the member 128 so that the shaft 105 may not be rotated from open circuit position of the switch. The rod 124 can only be released from engagement with the member 128 by latching the cover in closed position and consequently the switch may only be closed after latching the cover which results in movement of the rod to the position shown in Fig. 9. Also, as the rod end 131 lies closely adjacent the surface of the member 128 when in latched position it is not possible to move the latch to unlatched position without first opening the switch so that the rod 124 may then enter the passage 129. Rotational movement of the shaft 105 and member 128 is limited by engagement of a pin 128' on the member 128 with spaced stop pins 132 on the machine base. Movement of the rod 124 too far away from the member 128 when the cover is latched is prevented by engagement of the hub portion 133 of the arm 123 and the end 134 of the rod support 126. An effective interlock is thus provided which positively requires closure and locking of the cover before the switch may be closed, and just as positively demands opening of the switch before the cover can be unlatched. When the rod end 131 is in hole 129 of part 128 and switch is held in off position and the cover has been unlocked and raised to open position, a spring loaded ball detent 136 is provided to engage a receiving notch 137 in rod 124 to prevent rod 124 from moving out of locking position due to jarring or tilting of the machine, as for example on shipboard. A second notch 138 is provided to receive the detent when rod 124 is in unlocked position. The parts are thus retained in proper operating positions, and rod 124 is restrained from movement except under the force of manual operation applied through the control handle 82.

A drive is provided on the motor for the attachment of auxiliary devices such as shredders, grinders and other food treating appliances. As shown, a housing 140 is attached to the motor on the end of the housing opposite to the shaft extension 16. A driving connection 141 is provided between the motor shaft 14 and a worm shaft 142 which is suitably supported within the housing 140 by a bearing 143. The worm 142 meshes with a gear 145 which is mounted upon a shaft 146 carried in bearings 147. An extension 148 of the shaft 146 provides for driving engagement of devices which may be mounted upon the sleeve extension 149 of the housing 140.

All of the operating parts of the machine are enclosed to prevent improper operation or tampering. Further, the closure of machine parts has been completed to such a degree that the machine may be readily maintained in a sanitary condition and there are no corners or crevices wherein food particles may collect. The motor housing fits closely onto the base in such a manner that no food collecting pockets exist and in addition the motor housing serves as a closure for the belt drive which rotates the bowl. The bowl is a close fit upon its supporting member and the entrance of food here is prevented by the inter-fitting flanges 27 and 29. Liquids that may flow down over the exterior of the bowl are effectively prevented from reaching the bowl base by the provision of a downwardly depending flange 152 which encircles the bowl base and directs liquid flow so as to cause it to drip away from the bowl base. Any food particles that might collect in the latch mechanism are permitted free passage to the exterior of the machine by making the latch receiving member 117 hollow as indicated at 153. The opening 153 of the latch member communicates with the passage 154 in the part 91 that leads to the exterior of the machine so that collected food particles may fall free of the machine rather than collect within the space occupied by the latch mechanism. The passage of food particles into the latch mechanism is restricted by terminating the latch receiving member a considerable distance above the bowl and by providing at this point an opening which is just large enough to receive the latch cross bar.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In food handling apparatus of the character described, a drive motor having a motor switch, a receptacle, a cover movable to closed position over said receptacle, a latch rotatably carried by said cover, said latch having a projecting end portion movable to latched or unlatched position, a fixed latch receiving member, said receiving member having an opening shaped to pass the projecting end portion of the latch when in unlatched position, and a latch actuated member, said actuated member having a notch for reception of said projecting end portion upon insertion through the receiving member for movement of the actuated member, and an interlock for said motor switch operated by movement of said actuated member.

2. In food handling apparatus of the character described, a food treating knife, a motor driving said knife, a switch controlling the operation of said motor, a movable cover for said knife, a latch carried by said cover movable to a latched position to hold the cover in closed position over the knife, an interlock for said motor switch, a connection adapted to be effective between said latch and interlock when the cover is closed, and means for enclosing said connection to prevent any actuation of said switch except when said cover is closed, said latch being movable with said cover to open position when said connection is broken.

3. In food handling apparatus of the character described, a base, a food treating knife, a motor driving said knife, a switch controlling the operation of said motor, said switch comprising a movable member positioned in said base, a rod receiving portion on said movable member, a movable cover for said knife, a latch on said cover movable to latched position to hold the cover in closed position over the knife, means operated by movement of the latch to unlatched position to lock the switch in open circuit position, said means comprising a rod positioned in said base and axially movable to a position of engagement with the rod receiving portion of the switch member.

4. In food handling apparatus of the character described, a bowl adapted to receive foodstuffs, a movable cover for said bowl, control means carried by said movable cover, and socket means positioned for reception of said control means in cover closed position, said socket means having an opening therethrough providing a drain passage for material entering the socket means.

5. In food handling apparatus of the character described, a base, a bowl rotatably mounted on the base having a food retaining channel concentric with the axis of rotation of the bowl, a fixed knife shaft supported independently of the bowl and extending above the bowl eccentrically of the axis thereof and above the said channel with the shaft spaced close above the rim of said bowl, a supporting member for the bowl rotatably mounted on the base, engagement lugs on the under side of the bowl, and an attaching flange on the supporting member adapted to releasably receive said lugs in interlocking engagement to rotate said bowl when said supporting member is rotated, said engagement lugs and said flange having an effective lateral extent coordinated with the spacing of the said shaft above the rim of the bowl and its eccentric spacing with respect to the axis of rotation of the bowl, such that the bowl may be moved to release the interlocking engagement of said lugs with said flange, then tilted to bring one portion of the lugs above the said attaching flange, followed by movement of the bowl sidewise from the apparatus, all without disturbing the position of said knife shaft.

6. In food handling apparatus of the character described, a base, a bowl rotatably mounted on the base having a food retaining channel concentric with the axis of rotation of the bowl, a fixed knife shaft supported independently of the bowl and extending above the bowl eccentric of the axis thereof and above the said channel with the shaft spaced close above the rim of said bowl, a supporting member for the bowl rotatably mounted on the base, an upstanding annular flange on said supporting member adapted to cooperate with the bottom of the bowl to prevent the ingress of water, meat juices, and the like, spaced inwardly extending lugs carried by said flange, a downwardly depending annular member carried by the bowl on the under side thereof and adapted to be received within said upstanding annular flange, spaced outwardly extending lugs carried by said downwardly depending annular member and adapted to cooperate in interlocking engagement with the inwardly extending lugs on said flange, the effective diameters of said annular flange and the circumscribing circle of said bowl lugs being of a predetermined size not materially greater than one half the diameter of said bowl but nevertheless of sufficient extent to provide for tilting of the bowl about a bowl lug on one side of the bowl so as to raise a bowl lug on the other side of the bowl above the said annular flange without objectionable contact of the bowl rim with said fixed knife shaft, whereupon the bowl may be removed sidewise from the apparatus without disturbing the position of said knife shaft.

7. In food handling apparatus of the character described, a base, a bowl on said base adapted to receive foodstuffs for treatment therein, a driving motor fixedly mounted on said base and carrying a housing, an armature shaft extending from said housing on a fixed axis above said bowl, food treating means mounted on the extended portion of said shaft and adapted to operate within said bowl, a shaft rotatably mounted and enclosed within said base, means providing a detachable driving connection between said bowl and said last mentioned shaft for rotating said bowl and permitting removal of the latter without displacement of said armature shaft and treating means, and a fixed driving connection between said armature shaft and said bowl rotating shaft, said driving connection being enclosed within said housing and base.

8. In food handling apparatus of the character described, a base, a bowl on said base adapted to receive foodstuffs for treatment therein, a driving motor fixedly mounted on said base including a motor housing, an armature shaft extending from said housing on a fixed axis overhanging said bowl, a food cutting knife mounted on the extended overhanging portion of said shaft and adapted to cut foodstuffs within said bowl, a shaft rotatably mounted and enclosed within said base, means providing a detachable driving connection between said bowl and said last mentioned shaft for rotating said bowl and permitting removal thereof without displacement of said armature shaft and treating means, a drive pulley on said armature shaft, a driven pulley on said bowl rotating shaft, a flexible driving connection between said pulleys, said pulleys and said flexible driving connection being enclosed within said motor housing and base.

9. In food handling apparatus of the character described, a food treating knife, a motor driving said knife, a switch controlling the operation of said motor, and movable cover for said knife, a latch carried by said cover movable to a latched position to hold the cover in closed position over the knife, an interlock mechanism between said latch and said motor switch, means preventing actuation of said interlock mechanism except by said latch, said latch being movable with said cover to positively prevent actuation of said switch when said cover is open.

DAVID A. MEEKER.
JOHN C. SLAGER.